United States Patent
You et al.

(10) Patent No.: US 11,228,882 B2
(45) Date of Patent: Jan. 18, 2022

(54) APPARATUS AND METHOD FOR CONTROLLING WIRELESS COMMUNICATION LINKAGE IN VEHICLE

(71) Applicants: Hyundai Motor Company, Seoul (KR); Kia Motors Corporation, Seoul (KR)

(72) Inventors: Hye Won You, Seoul (KR); Min Hyuk Oh, Seoul (KR); Seung Jae Lee, Bucheon-si (KR); Pyoung Hwa Lee, Bucheon-si (KR); Hyung Jin Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/832,240

(22) Filed: Mar. 27, 2020

(65) Prior Publication Data
US 2021/0185494 A1    Jun. 17, 2021

(30) Foreign Application Priority Data

Dec. 17, 2019  (KR) .................. 10-2019-0168563

(51) Int. Cl.
*H04W 4/40* (2018.01)
*H04W 4/02* (2018.01)
*H04W 76/30* (2018.01)
*G01S 19/51* (2010.01)

(52) U.S. Cl.
CPC ............... *H04W 4/40* (2018.02); *G01S 19/51* (2013.01); *H04W 4/027* (2013.01); *H04W 76/30* (2018.02)

(58) Field of Classification Search
CPC ... H04W 4/00; H04W 4/027; H04W 1/72412; H04M 1/72412
USPC ... 455/404.1, 345, 456.5, 566, 456.2, 456.6, 455/456.1; 340/539.11
See application file for complete search history.

(56) References Cited

U.S. PATENT DOCUMENTS

| | | | | |
|---|---|---|---|---|
| 6,738,712 B1* | 5/2004 | Hildebrant | ............. | G01C 21/26 701/431 |
| 6,952,181 B2* | 10/2005 | Karr | ..................... | G01C 21/206 342/457 |
| 6,985,717 B1* | 1/2006 | Yoshioka | ............. | G08B 25/016 455/404.1 |

(Continued)

FOREIGN PATENT DOCUMENTS

| | | | |
|---|---|---|---|
| JP | 6380284 B2 * | 8/2018 | |
| KR | 20160119144 A | 10/2016 | |
| WO | WO-2017215803 A1 * | 12/2017 | ............. G01S 19/48 |

OTHER PUBLICATIONS

Wireless technologies for position awareness by Igor Vitas; Dijana Tralic Published in: 2016 International Symposium ELMAR Nov. 2016 (Year: 2016).*

(Continued)

*Primary Examiner* — William D Cumming
(74) *Attorney, Agent, or Firm* — Slater Matsil, LLP

(57) ABSTRACT

An embodiment wireless communication linkage control apparatus is configured to determine a position determination technique of a mobile terminal based on state information of a vehicle, to determine the current position of the mobile terminal, thereby controlling maintenance or release of wireless communication linkage with the mobile terminal depending on the position of the mobile terminal.

18 Claims, 5 Drawing Sheets

(56) References Cited

U.S. PATENT DOCUMENTS

| | | | |
|---|---|---|---|
| 8,676,270 B2* | 3/2014 | Ukai | H04M 1/72412 455/566 |
| 8,892,127 B2* | 11/2014 | Sridhara | G01S 5/10 455/456.2 |
| RE45,808 E* | 11/2015 | Sheynblat | G01S 5/06 |
| 9,291,704 B2* | 3/2016 | Sridhara | H04W 4/027 |
| 9,401,081 B2* | 7/2016 | Itoh | G08B 21/182 |
| RE46,991 E* | 8/2018 | Hildebrant | G01S 19/51 |
| 10,149,336 B2* | 12/2018 | Park | H04W 16/10 |
| 10,189,427 B2* | 1/2019 | Kim | B60K 37/06 |
| 10,205,819 B2* | 2/2019 | Hannon | G01S 5/18 |
| 10,547,736 B2* | 1/2020 | Hannon | H04W 4/40 |
| 10,569,740 B2* | 2/2020 | Lee | H04W 4/80 |
| 10,604,089 B2* | 3/2020 | Kim | B60R 16/0236 |
| 10,880,686 B1* | 12/2020 | Smith | H04W 4/80 |
| 2006/0046684 A1* | 3/2006 | Kameyama | B60Q 1/50 455/345 |
| 2008/0294302 A1* | 11/2008 | Basir | G07C 5/0858 701/2 |
| 2010/0130229 A1* | 5/2010 | Sridhara | H04W 4/027 455/456.1 |
| 2011/0210835 A1* | 9/2011 | Kondo | G08G 1/205 340/425.5 |
| 2012/0322507 A1* | 12/2012 | Ukai | H04M 1/72412 455/566 |
| 2013/0247117 A1* | 9/2013 | Yamada | G08C 17/02 725/93 |
| 2015/0031402 A1* | 1/2015 | Sridhara | G01S 19/49 455/456.6 |
| 2015/0230043 A1 | 8/2015 | Yakir et al. | |
| 2015/0243156 A1* | 8/2015 | Itoh | H04W 4/00 340/539.11 |
| 2017/0019525 A1* | 1/2017 | Hannon | G01S 5/0036 |
| 2018/0201207 A1* | 7/2018 | Kim | B60W 50/14 |
| 2019/0037034 A1* | 1/2019 | Lee | H04L 67/125 |
| 2019/0061685 A1* | 2/2019 | Lee | B60R 25/209 |
| 2019/0111871 A1* | 4/2019 | Kim | B60R 16/0236 |
| 2019/0199850 A1* | 6/2019 | Hannon | H04W 4/023 |
| 2019/0217816 A1* | 7/2019 | Lee | G06K 19/06037 |
| 2019/0220818 A1* | 7/2019 | Kanaoka | G06Q 10/08355 |
| 2019/0354956 A1* | 11/2019 | Lee | G06Q 20/3278 |
| 2019/0375372 A1* | 12/2019 | Sanji | B60R 25/31 |
| 2020/0172055 A1* | 6/2020 | Lee | H04W 12/06 |
| 2020/0204966 A1* | 6/2020 | Thagadur Shivappa | H04R 5/02 |
| 2020/0233072 A1* | 7/2020 | Osai | G08C 17/02 |
| 2021/0009079 A1* | 1/2021 | Bourassi | B60R 25/01 |
| 2021/0185494 A1* | 6/2021 | You | H04W 4/40 |
| 2021/0211835 A1* | 7/2021 | Smith | H04W 4/023 |

OTHER PUBLICATIONS

S. M. Kee and R. C. Marquart, "Navigation using local position determination from a mobile satellite terminal," 1989 IEEE Global Telecommunications Conference and Exhibition 'Communications Technology for the 1990s and Beyond', Nov. 1989, pp. 1398-1402 vol. 3, doi: 10.1109/GLOCOM.1989.64180. (Year: 1989).*

* cited by examiner

APPARATUS AND METHOD FOR CONTROLLING WIRELESS COMMUNICATION LINKAGE IN VEHICLE

CROSS-REFERENCE TO RELATED APPLICATIONS

This application claims priority to Korean Patent Application No. 10-2019-0168563, filed on Dec. 17, 2019, which application is hereby incorporated herein by reference.

TECHNICAL FIELD

The present disclosure relates to a wireless communication linkage control apparatus.

BACKGROUND

In general, a vehicular audio video navigation telematics (AVNT) system provides various conveniences to vehicle passengers by integrating various electronic devices such as an audio device, a video device, a navigation device and a telematics device mounted in a vehicle.

As such, the AVNT system has a plurality of electronic devices integrated therein and includes various functions and menus.

The AVNT system is wirelessly communication-linked with a mobile terminal such as a smartphone held by a vehicle passenger and provides convenience to the vehicle passenger.

The vehicular AVNT system is automatically and wirelessly communication-linked with a mobile terminal of a vehicle passenger through a wireless communication function such as Bluetooth when the mobile terminal held by the vehicle passenger is positioned within a vehicle.

However, when the mobile terminal of the vehicle passenger, which is wirelessly communication-linked with the vehicular AVNT system, is moved out of the vehicle from the inside of the vehicle, there is a problem in that the vehicular AVNT system maintains wireless communication linkage with the mobile terminal positioned outside the vehicle without releasing the wireless communication linkage, thereby providing inconvenience to a user.

In addition, when a mobile terminal of a driver and a mobile terminal of a passenger are each wirelessly communication-linked with the AVNT system and then wireless communication linkage is re-released within a vehicle, if the mobile terminal of the driver is moved out of the vehicle, the mobile terminal of the driver positioned outside the vehicle maintains wireless communication linkage without releasing wireless communication linkage with the AVNT system, but there is a problem in that the mobile terminal of the passenger positioned inside the vehicle is not capable of being wirelessly communication-linked with the AVNT system.

As such, conventionally, there is a problem in terms of a wireless communication linkage error whereby wireless communication linkage between a mobile terminal positioned outside a vehicle and a vehicular AVNT system is maintained rather than being released.

Accordingly, in the future, there is a need to develop a wireless communication linkage control device for reliably controlling maintenance or release of wireless communication linkage with a mobile terminal depending on a position of the mobile terminal.

SUMMARY

The present disclosure relates to a wireless communication linkage control apparatus. Particular embodiments relate to a wireless communication linkage control apparatus in a vehicle and a wireless communication linkage control method thereof for maintaining or releasing wireless communication linkage with a mobile terminal depending on whether the mobile terminal is present in the vehicle.

Additional embodiments relate to a wireless communication linkage control apparatus in a vehicle and a wireless communication linkage control method thereof for determining the position determination method of the mobile terminal based on state information of a vehicle to determine the current position of the mobile terminal, thereby reliably and optimally controlling maintenance or release of wireless communication linkage with the mobile terminal depending on the position of the mobile terminal.

The technical problems solved by the embodiments are not limited to above-described technical problems and other technical problems which are not described herein will become apparent to those skilled in the art from the following description.

In an embodiment of the present disclosure, a wireless communication linkage control apparatus includes a communicator that is wirelessly communication-linked with a mobile terminal, a position signal receiver configured to recognize a position of a vehicle, and a controller configured to control the communicator, wherein the controller receives global positioning system (GPS) information including position information from the mobile terminal, compares a position signal of the vehicle with GPS information of the mobile terminal to calculate a distance or speed difference between the mobile terminal and the vehicle, and when the calculated distance or speed difference is equal to or greater than a threshold value, the controller determines that a current position of the mobile terminal is outside of the vehicle, and releases wireless communication linkage with the mobile terminal.

In another embodiment of the present disclosure, a wireless communication linkage control apparatus includes a communicator that is wirelessly communication-linked with a mobile terminal, a position signal receiver configured to recognize a position of a vehicle, a position signal transmitter configured to transmit a position signal to the mobile terminal, and a controller configured to control the communicator, wherein, when the mobile terminal is in wireless communication linkage, the controller acquires state information of the vehicle, determines a position determination method of the mobile terminal based on the acquired state information of the vehicle, determines a current position determination method of the mobile terminal as the determined position determination method, and controls the communicator to release wireless communication linkage with the mobile terminal when determining that the current position of the mobile terminal is outside of the vehicle.

In another embodiment of the present disclosure, a method of controlling wireless communication linkage of a wireless communication linkage control apparatus comprising a controller configured to control wireless communication linkage with a mobile terminal, a position signal receiver configured to recognize a position of a vehicle, and a position signal transmitter configured to transmit a position signal to the mobile terminal is provided. The method includes receiving global positioning system (GPS) information including position information from the mobile terminal, by the controller, comparing a position signal of the vehicle with the GPS information of the mobile terminal to calculate a distance or speed difference between the vehicle and the mobile terminal, by the controller, and determining that a current position of the mobile terminal is outside of the vehicle based on the calculated distance or speed difference and releasing wireless communication linkage with the mobile terminal, by the controller.

In another embodiment of the present disclosure, a method of controlling wireless communication linkage of a wireless communication linkage control apparatus comprising a controller configured to control wireless communication linkage with a mobile terminal, a position signal receiver configured to recognize a position of a vehicle, and a position signal transmitter configured to transmit a position signal to the mobile terminal is provided. The method includes checking whether the mobile terminal is in wireless communication linkage, by the controller, when the mobile terminal is in wireless communication linkage, acquiring the state information of the vehicle, by the controller, determining a position determination method of the mobile terminal based on the acquired state information of the vehicle, by the controller, determining a current position of the mobile terminal as the determined position determination method, by the controller, and when determining that the current position of the mobile terminal is outside of the vehicle, releasing wireless communication linkage with the mobile terminal, by the controller.

In another embodiment of the present disclosure, a computer-readable recording medium having recorded thereon a program for executing the method of controlling wireless communication linkage of a wireless communication linkage control apparatus in a vehicle performs procedures provided in the method of controlling wireless communication linkage of a wireless communication linkage control apparatus in a vehicle.

In another embodiment of the present disclosure, a vehicle includes a sensing apparatus configured to sense state information of the vehicle and a wireless communication linkage control apparatus configured to release wireless communication linkage with the mobile terminal when a current position of the mobile terminal is outside of the vehicle. The wireless communication linkage control apparatus includes a communicator that is wirelessly communication-linked with the mobile terminal, a position signal transmitter configured to transmit a position signal to the mobile terminal, and a controller configured, when the mobile terminal is in wireless communication linkage, to acquire state information of the vehicle from the sensing apparatus, to determine a position determination method of the mobile terminal based on the acquired state information of the vehicle, to determine a current position determination method of the mobile terminal as the determined position determination method, and to control the communicator to release wireless communication linkage with the mobile terminal when determining that the current position of the mobile terminal is outside of the vehicle.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

Figure 1:
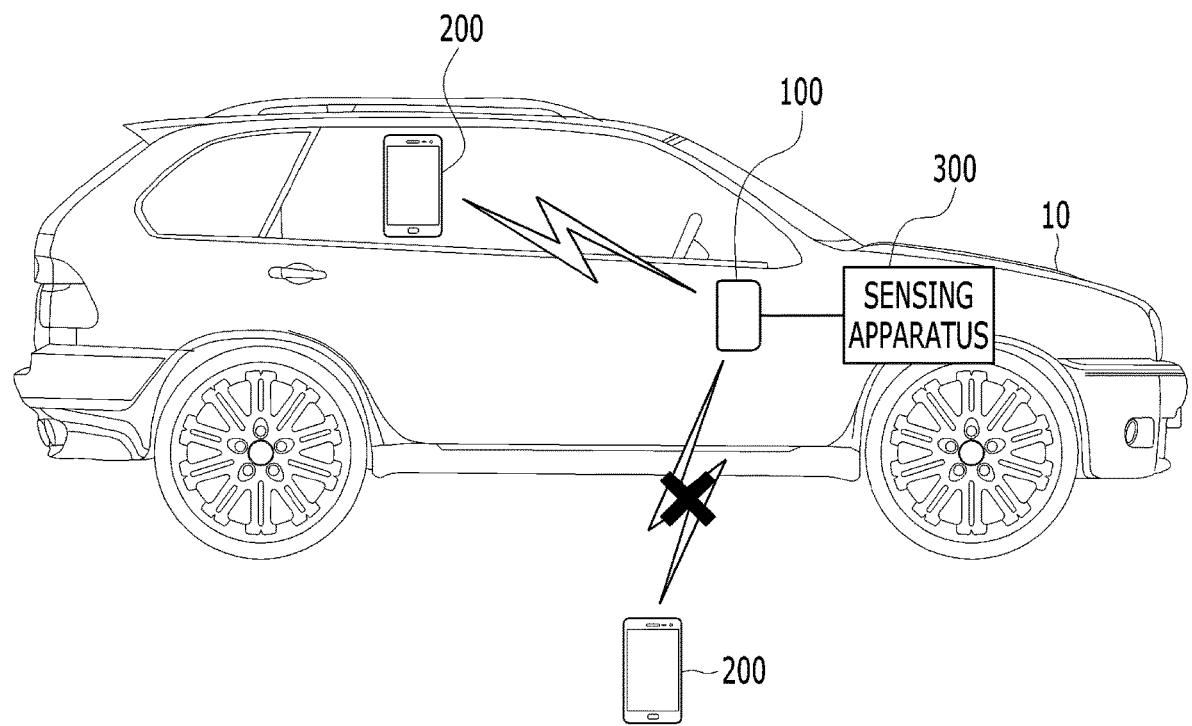
FIG. 1 is a diagram for explaining a vehicle in which a wireless communication linkage control apparatus is disposed according to an embodiment of the present disclosure.

Hereinafter, the embodiments of the present disclosure will be described in detail with reference to the accompanying drawings so as to be easily implemented by those skilled in the art. However, the present disclosure may be variously implemented and is not limited to the embodiments described herein. In the drawings, in order to clearly describe the present disclosure, portions which are not related to the description of the present disclosure will be omitted and similar portions are denoted by similar reference numerals throughout the specification.

In the entire specification, when a certain portion "includes" a certain component, this indicates that other components are not excluded, but may be further included unless specially described. The terms "unit", "-or/er" and "module" described in the specification indicate a unit for processing at least one function or operation, which may be implemented by hardware, software or a combination thereof.

Throughout the specification, when a certain portion "includes" a certain component, this indicates that the other components are not excluded, but may be further included unless specially described. The same reference numbers will be used throughout the drawings to refer to the same or like parts.

Hereinafter, an apparatus and method for controlling wireless communication linkage in a vehicle to which embodiments of the present disclosure are applicable will be described in detail with reference to FIGS. 1 to 5.

A wireless communication linkage control apparatus in a vehicle according to embodiments of the present disclosure may be applied to an audio video navigation telematics (AVNT) system but is not limited thereto.

Figure 2:
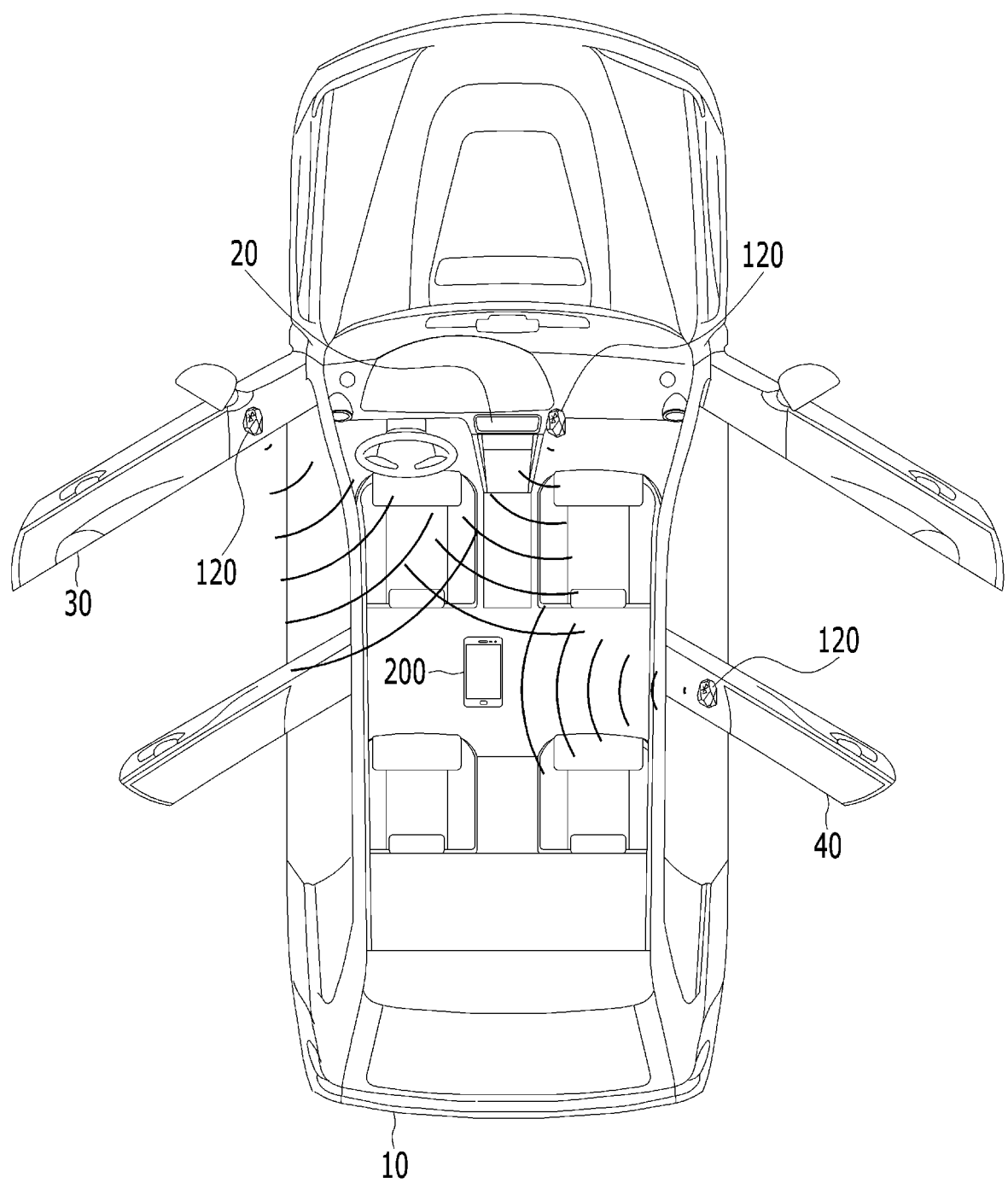
FIG. 2 is a diagram for explaining a position signal transmitter of a wireless communication linkage control apparatus disposed in a vehicle.

FIG. 1 is a diagram for explaining a vehicle in which a wireless communication linkage control apparatus is disposed according to an embodiment of the present disclosure. FIG. 2 is a diagram for explaining a position signal transmitter of a wireless communication linkage control apparatus disposed in a vehicle.

As shown in FIG. 1, a vehicle 10 may include a sensing apparatus 300 for sensing state information of the vehicle 10, and a wireless communication linkage control apparatus 100 for releasing wireless communication linkage with a mobile terminal 200 when the current position of the mobile terminal 200 is outside the vehicle.

Here, when the mobile terminal 200 is in wireless communication linkage, the wireless communication linkage control apparatus 100 may acquire state information of the vehicle 10 from the sensing apparatus 300, may determine a position determination method of the mobile terminal 200 based on the acquired state information of the vehicle, may determine a current position of the mobile terminal 200 using the determined position determination method, and may release wireless communication linkage with the mobile terminal 200 when the current position of the mobile terminal 200 is outside of the vehicle.

For example, the mobile terminal 200 may include a portable phone, a smartphone, a laptop computer, a digital broadcast terminal, a personal digital assistant (PDA), a portable multimedia player (PMP), a navigation device, a slate personal computer (PC), a tablet PC, an ultrabook, a wearable device (e.g., a smartwatch, a smart glass, or a head mounted display (HMD)), or the like.

As shown in FIG. 2, the wireless communication linkage control apparatus 100 may include a position signal transmitter 120 for transmitting a position signal to a mobile terminal.

Here, the position signal transmitter 120 may be a communication device for transmitting a position signal to the mobile terminal 200 in order to recognize a position of the mobile terminal 200 and may include a Bluetooth low energy (BLE) beacon, but the present disclosure is not limited thereto.

For example, the position signal transmitter 120 may be disposed in each of a front door 30, a rear door 40, and a center fascia 20 of the vehicle 10, but the present disclosure is not limited thereto.

The position signal transmitter 120 may be used when determining the current position of the mobile terminal 200 based on a position determination method using a high-frequency sound technology, a position determination method using a trilateration technology, a position determination method using a finger printing technology, or the like among position determination methods of the mobile terminal 200.

When acquiring the state information of the vehicle 10, the wireless communication linkage control apparatus 100 may acquire information on opening and closing of a vehicular window and information on the current position of the vehicle.

This is because an optimized position determination method needs to be determined among position determination methods of the mobile terminal 200 based on the information of the vehicle 10.

Then, when determining the position determination method of the mobile terminal 200, the wireless communication linkage control apparatus 100 may apply a weight of the position determination methods of the mobile terminal 200 based on the state information of the vehicle 10 and may determine the position determination method of the mobile terminal 200 based on the applied weight.

Here, when the wireless communication linkage control apparatus 100 applies the weight, a method of applying a weight of the position determination methods of the mobile terminal 200 may be changed depending on the state information of the vehicle 10.

Then, when determining the position determination method of the mobile terminal 200, the wireless communication linkage control apparatus 100 may check a weight applied to each of the position determination methods of the mobile terminal 200, may select a position determination method to which the highest weight is applied, and may determine the selected position determination method as the position determination method of the mobile terminal.

For example, when the wireless communication linkage control apparatus 100 determines the current position of the mobile terminal 200, if the determined position determination method is a position determination method using a high-frequency sound technology, the wireless communication linkage control apparatus 100 may determine whether the mobile terminal 200 recognizes a high-frequency sound of a signal received from the position signal transmitter 120 based on signal information of the position signal transmitter 120, received from the mobile terminal 200, and in this regard, when determining that the mobile terminal 200 recognizes the high-frequency sound of the position signal transmitter 120, the wireless communication linkage control apparatus 100 may determine that the current position of the mobile terminal 200 is the inside of the vehicle of the mobile terminal 200, and when determining that the mobile terminal 200 does not recognize the high-frequency sound of the position signal transmitter 120, the wireless communication linkage control apparatus 100 may determine that the current position of the mobile terminal 200 is outside of the vehicle.

Here, the wireless communication linkage control apparatus 100 may perform the position determination method using a high-frequency sound technology using any one of the position signal transmitters 120 disposed at each of the front door 30, the rear door 40, and the center fascia 20 of the vehicle 10.

In another example, when the wireless communication linkage control apparatus 100 determines the current position of the mobile terminal 200, if the determined position determination method is the position determination method using a trilateration technology, the wireless communication linkage control apparatus 100 may perform trilateration based on signal information of first, second, and third position signal transmitters 120, received from the mobile terminal 200, to calculate the current position of the mobile terminal 200, and may determine that the current position of the mobile terminal 200 is inside or outside the vehicle based on the calculated current position of the mobile terminal 200.

Here, the wireless communication linkage control apparatus 100 may perform the position determination method using a trilateration technology using the first position signal transmitter 120 disposed in the front door 30 of the vehicle 10, the second position signal transmitter 120 disposed in the rear door 40, and the third position signal transmitter 120 disposed in the center fascia 20.

In another example, when the wireless communication linkage control apparatus 100 determines the current position of the mobile terminal 200, if the determined position determination method is the position determination method using a finger printing technology, the wireless communication linkage control apparatus 100 may extract signal intensity information from signal information of the position signal transmitter 120, received from the mobile terminal 200, may search for the current position of the mobile terminal 200 from a radio map including signal intensity values corresponding to a space cell inside a vehicle based on the extracted signal intensity, and may determine that the current position of the mobile terminal 200 is inside or outside the vehicle based on the retrieved current position of the mobile terminal 200.

Here, the radio map including signal intensity values corresponding to the space cell inside the vehicle may be pre-stored in a vehicular memory or may be received from an external server.

In another example, when the wireless communication linkage control apparatus 100 determines the current position of the mobile terminal 200, if the determined position determination method is the position determination method using position information of the mobile terminal 200, the wireless communication linkage control apparatus 100 may receive global positioning system (GPS) information including position information from the mobile terminal, may calculate a distance or speed difference between the vehicle and the mobile terminal based on the GPS information of the mobile terminal and the GPS information as the position signal of the vehicle, and may determine the current position of the mobile terminal based on the calculated distance or speed difference.

Figure 3:
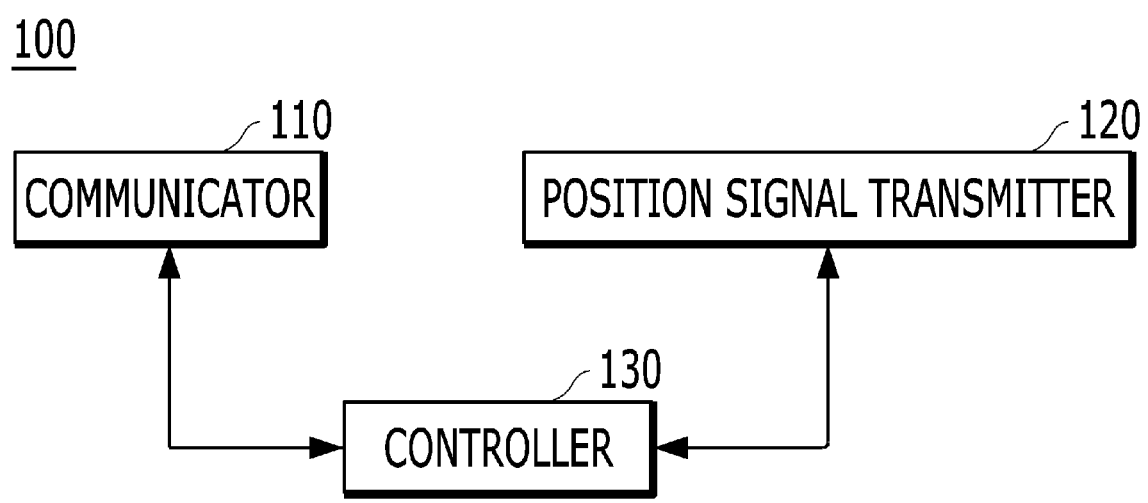
FIG. 3 is a block diagram for explaining a wireless communication linkage control apparatus in a vehicle according to an embodiment of the present disclosure.

FIG. 3 is a block diagram for explaining a wireless communication linkage control apparatus in a vehicle according to an embodiment of the present disclosure.

As shown in FIG. 3, a wireless communication linkage control apparatus 100 according to embodiments of the present disclosure may include a communicator 110 that is wirelessly communication-linked with a mobile terminal positioned inside a vehicle, the position signal transmitter 120 for transmitting a position signal to the mobile terminal, and a controller 130 for controlling the communicator 110.

Here, the communicator 110 may include a Bluetooth module and may be wirelessly communication-linked with the mobile terminal through the Bluetooth, but the present disclosure is not limited thereto.

The position signal transmitter 120 may include a Bluetooth low energy (BLE) beacon, but the present disclosure is not limited thereto.

For example, the position signal transmitter 120 may be disposed at each of a front door, a rear door, and a center fascia of a vehicle but the present disclosure is not limited thereto.

Then, when the mobile terminal is in wireless communication linkage, the controller 130 may acquire state information of the vehicle, may determine a position determination method of the mobile terminal based on the acquired state information of the vehicle, may determine the current position of the mobile terminal using the determined position determination method, and may control the communicator no to release wireless communication linkage with the mobile terminal when the current position of the mobile terminal is outside of the vehicle.

Here, when acquiring the state information of the vehicle, the controller 130 may acquire information on opening and closing of a vehicular window and information on the current position of the vehicle.

For example, the controller 130 may acquire the information on opening and closing of a vehicular window from a vehicular window sensor and may acquire the information on the current position of the vehicle from a vehicle navigation device.

When determining the position determination method of the mobile terminal, the controller 130 may apply a weight of position determination methods of the mobile terminal based on the state information of the vehicle, and may determine a position determination method of the mobile terminal based on the applied weight.

For example, when applying a weight, the controller 130 may apply the weight of a first position determination method using a high-frequency sound technology, a second position determination method using a trilateration technology, a third position determination method using a finger printing technology, and a fourth position determination method using position information of a mobile terminal among position determination methods of the mobile terminal.

When the controller 130 applies the weight, a method of applying a weight of the position determination methods of the mobile terminal may be changed depending on the state information of the vehicle.

For example, when the controller 130 applies the weight, if the controller 130 determines that a vehicular window is closed and the current position of the vehicle is not a downtown area from the state information of the vehicle, the controller 130 may apply the weight of the position determination methods of the mobile terminal to a first weight applying method.

In another example, when the controller 130 applies the weight, if the controller 130 determines that a vehicular window is closed and the current position of the vehicle is a downtown area from the state information of the vehicle, the controller 130 may apply the weight of the position determination methods of the mobile terminal to a second weight applying method.

In another example, when the controller 130 applies the weight, if the controller 130 determines that a vehicular window is open and the current position of the vehicle is not a downtown area from the state information of the vehicle, the controller 130 may apply the weight of the position determination methods of the mobile terminal to a third weight applying method.

In another example, when the controller 130 applies the weight, if the controller 130 determines that a vehicular window is open and the current position of the vehicle is a downtown area from the state information of the vehicle, the controller 130 may apply the weight of the position determination methods of the mobile terminal to a fourth weight applying method.

Here, when determining that a vehicular window is closed from the state information of the vehicle, the controller 130 may determine whether all vehicular windows are closed.

When determining whether the vehicular window is open based on the state information of the vehicle, the controller 130 may determine whether at least one vehicular window is open.

When the controller 130 applies the weight, if the controller 130 determines that a vehicular window is closed and the current position of the vehicle is not a downtown area from the state information of the vehicle, the controller 130 may apply a first weight as the highest weight of the position determination method using a high-frequency sound technology, may apply a second weight lower than the first weight to a position determination method using position information of the mobile terminal, and may apply a third weight lower than the second weight to the position determination method using a trilateration technology and the position determination method using a finger printing technology, among the position determination methods of the mobile terminal.

For example, the controller 130 may apply a weight of about 80% to the position determination method using a high-frequency sound technology, may apply a weight of about 10% to the position determination method using position information of a mobile terminal, and may apply a weight of about 5% to each of the position determination method using a trilateration technology and the position determination method using a finger printing technology.

In another case, when the controller 130 applies the weight, if the controller 130 determines that a vehicular window is closed and the current position of the vehicle is a downtown area from the state information of the vehicle, the controller 130 may apply a first weight as the highest weight to the position determination method using a high-frequency sound technology, may apply a second weight lower than the first weight to the position determination method using a finger printing technology, and may apply a third weight lower than the second weight to the position determination method using a trilateration technology and the position determination method using position information of the mobile terminal, among the position determination methods of the mobile terminal.

For example, the controller 130 may apply a weight of about 80% to the position determination method using a high-frequency sound technology, may apply a weight of about 10% to the position determination method using a finger printing technology, and may apply a weight of about 5% to each of the position determination method using a trilateration technology and the position determination method using a position information of a mobile terminal.

In another case, when the controller 130 applies the weight, if the controller 130 determines that a vehicular window is closed and the current position of the vehicle is not a downtown area from the state information of the vehicle, the controller 130 may apply the same weight to the position determination method using a high-frequency sound technology, the position determination method using position information of the mobile terminal, the position determination method using a trilateration technology, and the position determination method using a finger printing technology, among the position determination methods of the mobile terminal.

For example, the controller 130 may apply a weight of about 25% to each of the position determination method using a high-frequency sound technology, the position determination method using position information of the mobile terminal, the position determination method using a trilateration technology, and the position determination method using a finger printing technology.

In another case, when the controller 130 applies the weight, if the controller 130 determines that a vehicular window is open and the current position of the vehicle is a downtown area from the state information of the vehicle, the controller 130 may apply a first weight as the highest weight to the position determination method using a finger printing technology, may apply a second weight lower than the first weight to each of the position determination method using a high-frequency sound technology and the position determination method using a trilateration technology, and may apply a third weight lower than the second weight to the position determination method using position information of the mobile terminal, among the position determination methods of the mobile terminal.

For example, the controller 130 may apply a weight of about 35% to the position determination method using a finger printing technology, may apply a weight of about 25% to the position determination method using a high-frequency sound technology and the position determination method using a trilateration technology, and may apply a weight of about 15% to the position determination method using position information of a mobile terminal.

Then, when determining the position determination method of the mobile terminal, the controller 130 may check a weight applied to each of the position determination methods of the mobile terminal, may select a position determination method to which the highest weight is applied, and may determine the selected position determination method as the position determination method of the mobile terminal.

When the controller 130 determines the current position of the mobile terminal, if the determined position determination method is a position determination method using a high-frequency sound technology, the controller 130 may determine whether the mobile terminal recognizes a high-frequency sound of a signal received from the position signal transmitter 120 based on signal information of the position signal transmitter 120, received from the mobile terminal, and, when determining that the mobile terminal recognizes the high-frequency sound of the position signal transmitter 120, the controller 130 may determine that the current position of the mobile terminal is inside of the vehicle of the mobile terminal.

Here, when the controller 130 determines whether the mobile terminal recognizes a high-frequency sound of a signal received from the position signal transmitter 120, if the controller 130 determines that the mobile terminal does not recognize a high-frequency sound of the position signal transmitter 120, the controller 130 may determine that the current position of the mobile terminal is outside of the vehicle.

As necessary, when the controller 130 determines the current position of the mobile terminal, if the determined position determination method is the position determination method using a trilateration technology, the controller 130 may perform trilateration to calculate the current position of the mobile terminal based on signal information of the first, second, and third position signal transmitters 120, received from the mobile terminal, and may determine that the current position of the mobile terminal is inside or outside of the vehicle based on the calculated current position of the mobile terminal.

In another case, when the controller 130 determines the current position of the mobile terminal, if the determined position determination method is the position determination method using a finger printing technology, the controller 130 may extract signal intensity from signal information of the position signal transmitter 120, received from the mobile terminal, may search for the current position of the mobile terminal from a radio map including signal intensity values corresponding to a space cell inside a vehicle based on the extracted signal intensity, and may determine that the current position of the mobile terminal is inside or outside of the vehicle based on the retrieved current position of the mobile terminal.

In another case, when the controller 130 determines the current position of the mobile terminal, if the determined position determination method is the position determination method using position information of the mobile terminal, the controller 130 may receive global positioning system (GPS) information including position information from the mobile terminal, may calculate a distance or speed difference between the vehicle and the mobile terminal based on the GPS information of the mobile terminal and the GPS information as the position signal of the vehicle, and may determine the current position of the mobile terminal based on the calculated distance or speed difference.

As such, according to embodiments of the present disclosure, the position determination method of the mobile terminal may be determined based on the state information of the vehicle to determine the current position of the mobile terminal, and thus maintenance or release of wireless communication linkage with the mobile terminal may be reliably and optimally controlled depending on the position of the mobile terminal.

For example, when a user of a smartphone goes outside of the vehicle from the inside of the vehicle while holding the smartphone, Bluetooth (BT) between an audio video navigation telematics (AVNT) system and the smartphone may be normally released to enhance marketability.

According to embodiments of the present disclosure, linkage with a user's smartphone positioned outside the vehicle may be prevented, thereby enhancing the usability of BT.

Figure 4:
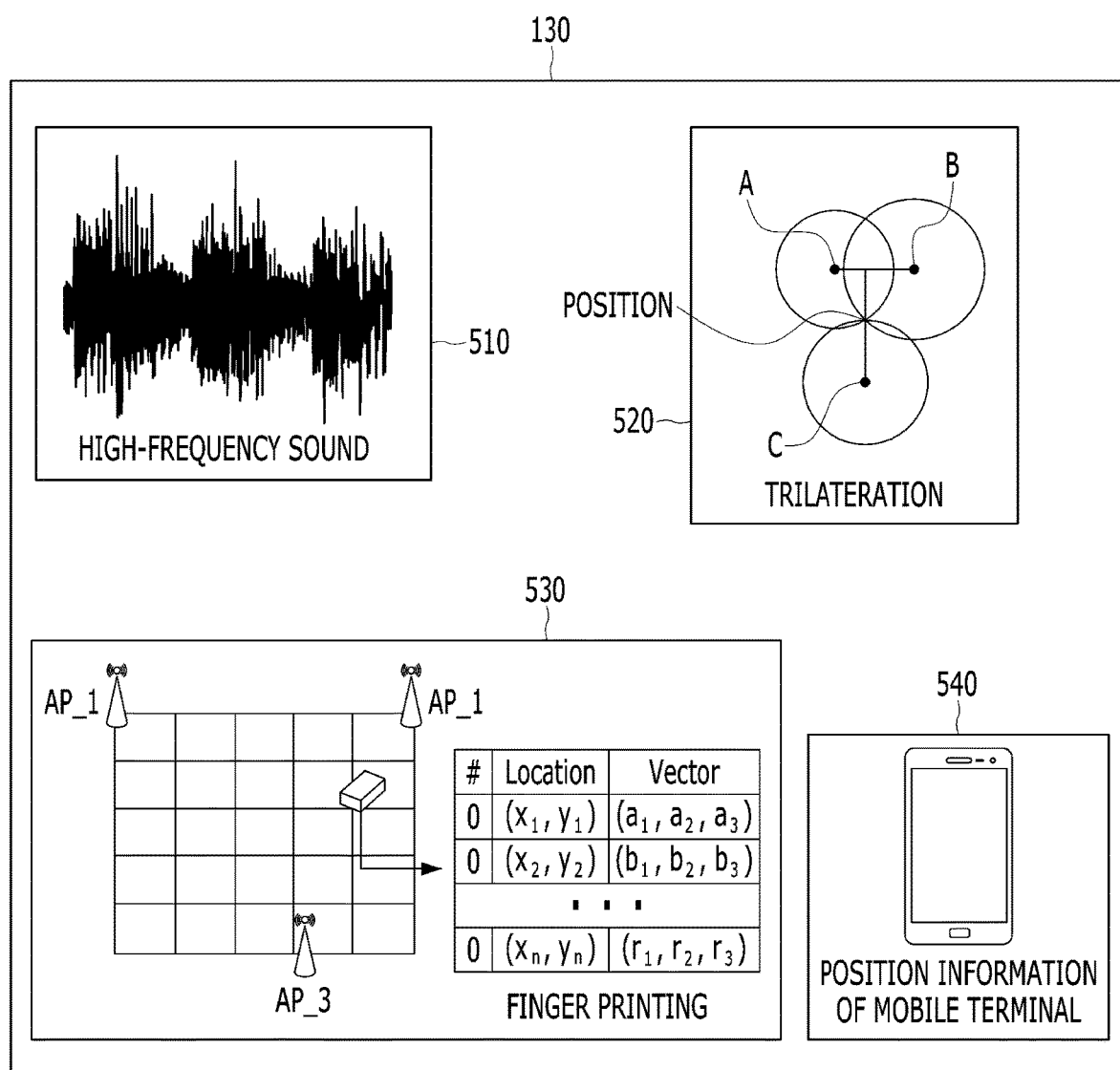
FIG. 4 is a diagram for explaining a mobile terminal position determination method of a wireless communication linkage control apparatus according to an embodiment of the present disclosure.

FIG. 4 is a diagram for explaining a mobile terminal position determination method of a wireless communication linkage control apparatus according to embodiments of the present disclosure.

The wireless communication linkage control apparatus according to embodiments of the present disclosure may apply a weight of position determination methods of the mobile terminal based on the state information of the vehicle and may determine the position determination method of the mobile terminal based on the applied weight.

As shown in FIG. 4, the controller 130 according to embodiments of the present disclosure may determine the current position of the mobile terminal based on the position determination methods of a plurality of mobile terminals.

Here, the controller 130 may perform at least one position determination method of a first position determination method 510 using a high-frequency sound technology, a second position determination method 520 using a trilateration technology, a third position determination method 530 using a finger printing technology, or a fourth position determination method 540 using position information of the mobile terminal and may determine the current position of the mobile terminal.

For example, in the first position determination method 510 using a high-frequency sound technology, whether the mobile terminal recognizes a high-frequency sound of a signal received from a position signal transmitter may be determined based on signal information of the position signal transmitter, received from the mobile terminal, and in this regard, when determining that the mobile terminal recognizes the high-frequency sound of the position signal transmitter 120, the current position of the mobile terminal may be determined to be inside of the vehicle, and when determining that the mobile terminal does not recognize the high-frequency sound of the position signal transmitter 120, the current position of the mobile terminal may be determined to be outside of the vehicle.

In another example, in the second position determination method 520 using a trilateration technology, trilateration may be performed based on signal information of first, second, and third position signal transmitters, received from the mobile terminal, to calculate the current position of the mobile terminal, and the current position of the mobile terminal may be determined to be inside or outside of the vehicle based on the calculated current position of the mobile terminal.

In another example, in the third position determination method 530 using a finger printing technology, signal intensity may be extracted from signal information of the position signal transmitter, received from the mobile terminal, the current position of the mobile may be searched for from a radio map including signal intensity values corresponding to a space cell inside a vehicle based on the extracted signal intensity, and the current position of the mobile terminal may be determined to be inside or outside of the vehicle based on the retrieved current position of the mobile terminal.

In another example, in the fourth position determination method 540 using position information of the mobile terminal, global positioning system (GPS) information including position information may be received from the mobile terminal, a distance or speed difference between the vehicle and the mobile terminal may be calculated based on the GPS information of the mobile terminal and the GPS information as the position signal of the vehicle, and the current position of the mobile terminal may be determined based on the calculated distance or speed difference.

Figure 5:
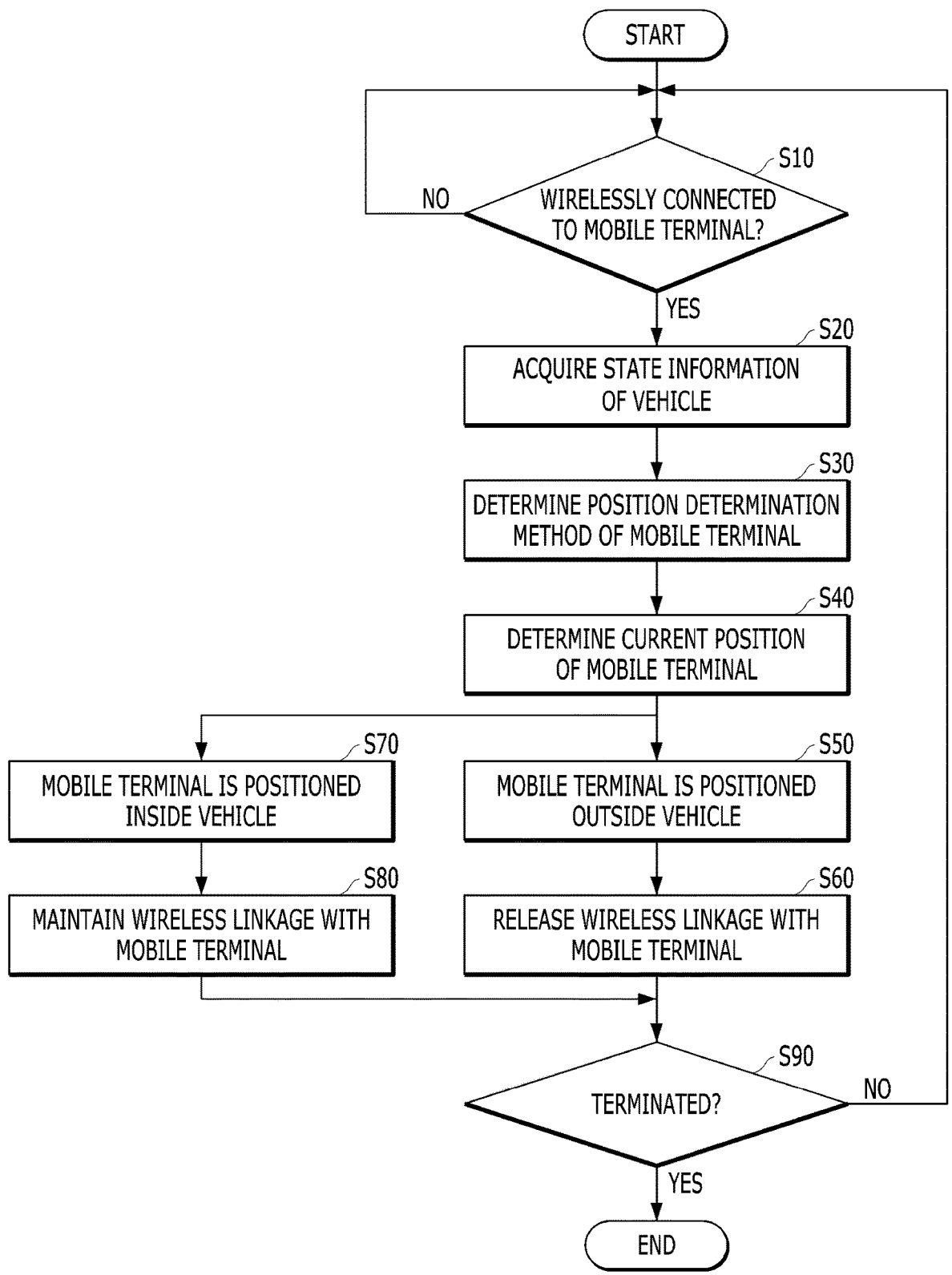
FIG. 5 is a flowchart for explaining a method of controlling wireless communication linkage of a wireless communication linkage control apparatus according to an embodiment of the present disclosure.

FIG. 5 is a flowchart for explaining a method of controlling wireless communication linkage of a wireless communication linkage control apparatus according to embodiments of the present disclosure.

As shown in FIG. 5, according to embodiments of the present disclosure, a controller may check whether a mobile terminal is in wireless communication linkage (S10).

Here, the controller may check whether the mobile terminal is in wireless communication linkage through Bluetooth.

The controller may acquire state information of the vehicle when the mobile terminal is in wireless communication linkage (S20).

Here, the controller may acquire the state information of the vehicle including information on opening and closing of a vehicular window and information on the current position of the vehicle.

Then, the controller may determine a position determination method of the mobile terminal based on the acquired state information of the vehicle (S30).

Here, the controller may apply a weight of position determination methods of the mobile terminal based on the state information of the vehicle and may determine the position determination method of the mobile terminal based on the applied weight.

For example, when applying a weight, the controller may apply a weight of the first position determination method using a high-frequency sound technology, the second position determination method using a trilateration technology, the third position determination method using a finger printing technology, and the fourth position determination method using position information of the mobile terminal, among the position determination methods of the mobile terminal.

When the controller applies a weight, a method of applying a weight of the position determination methods of the mobile terminal may be changed depending on the state information of the vehicle.

For example, when the controller applies a weight, if the controller determines that a vehicular window is closed and the current position of the vehicle is not a downtown area from the state information of the vehicle, the controller may apply the weight of the position determination methods of the mobile terminal to a first weight applying method.

Here, in the first weight applying method among the position determination methods of the mobile terminal, a first weight as the highest weight may be applied to the position determination method using a high-frequency sound technology, a second weight lower than the first weight may be applied to the position determination method using position information of the mobile terminal, and a third weight lower than the second weight may be applied to each of the position determination method using a trilateration technology and the position determination method using a finger printing technology.

In another example, when the controller applies a weight, if the controller determines that a vehicular window is closed and the current position of the vehicle is a downtown area from the state information of the vehicle, the controller may apply the weight of the position determination methods of the mobile terminal to a second weight applying method.

Here, in the second weight applying method among the position determination methods of the mobile terminal, a first weight as the highest weight may be applied to the position determination method using a high-frequency sound technology, a second weight lower than the first weight may be applied to the position determination method using a finger printing technology, and a third weight lower than the second weight may be applied to each of the position determination method using a trilateration technology and the position determination method using position information of the mobile terminal.

In another example, when the controller applies a weight, if the controller determines that a vehicular window is open and the current position of the vehicle is not a downtown area from the state information of the vehicle, the controller may apply the weight of the position determination methods of the mobile terminal to a third weight applying method.

Here, in the third weight applying method among the position determination methods of the mobile terminal, the same weight may be applied to the position determination method using a high-frequency sound technology, the position determination method using position information of the mobile terminal, the position determination method using a trilateration technology, and the position determination method using a finger printing technology.

As another example, when the controller applies a weight, if the controller determines that a vehicular window is open and the current position of the vehicle is a downtown area from the state information of the vehicle, the controller may apply the weight of the position determination methods of the mobile terminal to a fourth weight applying method.

Here, in the fourth weight applying method among the position determination methods of the mobile terminal, a first weight as the highest weight may be applied to the position determination method using a finger printing technology, a second weight lower than the first weight may be applied to each of the position determination method using a high-frequency sound technology and the position determination method using a trilateration technology, and a third weight lower than the second weight may be applied to the position determination method using position information of the mobile terminal.

When determining the position determination method of the mobile terminal, the controller may check a weight applied to each of the position determination methods of the mobile terminal, may select a position determination method to which the highest weight is applied, and may determine the selected position determination method as the position determination method of the mobile terminal.

Then, the controller may determine the current position of the mobile terminal using the determined position determination method (S40).

Here, when the determined position determination method is the position determination method using a high-frequency sound technology, the controller may determine whether the mobile terminal recognizes a high-frequency sound of a signal received from a position signal transmitter based on the signal information of the position signal transmitter, received from the mobile terminal, and in this regard, when determining that the mobile terminal recognizes the high-frequency sound of the position signal transmitter, the controller may determine that the current position of the mobile terminal is inside of the vehicle, and when determining that the mobile terminal does not recognize that high-frequency sound of the position signal transmitter, the controller may determine that the current position of the mobile terminal is outside of the vehicle.

As necessary, when the determined position determination method is the position determination method using a trilateration technology, the controller may perform trilateration to calculate the current position of the mobile terminal based on signal information of the first, second, and third position signal transmitters, received from the mobile terminal, and may determine that the current position of the mobile terminal is inside or outside of the vehicle based on the calculated current position of the mobile terminal.

In another case, when the determined position determination method is the position determination method using a finger printing technology, the controller may extract signal intensity information from signal information of the position signal transmitter, received from the mobile terminal, may search for the current position of the mobile terminal from a radio map including signal intensity values corresponding to a space cell inside a vehicle based on the extracted signal intensity information, and may determine that the current position of the mobile terminal is inside or outside of the vehicle based on the retrieved current position of the mobile terminal.

In another case, when the determined position determination method is the position determination method using position information of the mobile terminal, the controller may receive global positioning system (GPS) information including position information from the mobile terminal, may calculate a distance or speed difference between the vehicle and the mobile terminal based on the GPS information of the mobile terminal and the GPS information as the position signal of the vehicle, and may determine the current position of the mobile terminal based on the calculated distance or speed difference.

When determining that the current position of the mobile terminal is outside of the vehicle (S50), the controller may release wireless communication linkage with the mobile terminal (S60).

When determining that the current position of the mobile terminal is inside of the vehicle (S70), the controller may maintain wireless communication linkage with the mobile terminal (S80).

Then, the controller may check whether there is a request for termination of a procedure of processing control of wireless communication linkage (S90) and, when there is the request for termination, the controller may terminate the procedure of processing control of wireless communication linkage.

A method of controlling wireless communication linkage of a wireless communication linkage control apparatus according to another embodiment of the present disclosure will be described.

A controller according to the present disclosure may receive GPS information including position information from a mobile terminal.

Then, the controller may compare a position signal of a vehicle with GPS information of the mobile terminal to calculate a distance or speed difference between the mobile terminal and the vehicle.

Then, when the calculated distance or speed difference is equal to or greater than a threshold value, the controller may determine that the current position of the mobile terminal is outside of the vehicle and may release wireless communication linkage with the mobile terminal.

As necessary, the controller may determine whether the mobile terminal recognizes a high-frequency sound of a signal of a position signal transmitter, received from the mobile terminal, and when the mobile terminal does not recognize a high-frequency sound of the position signal transmitter or the calculated distance or speed difference is equal to or greater than the threshold value, the controller may determine that the current position of the mobile terminal is outside of the vehicle and may release wireless communication linkage with the mobile terminal.

In another case, the controller may perform trilateration to calculate the current position of the mobile terminal based on information transmitted by the mobile terminal in response to the first, second, and third position signals of the position signal transmitters, and when the calculated current position of the mobile terminal corresponds to outside of the vehicle or the calculated distance or speed difference is equal to or greater than the threshold value, the controller may release wireless communication linkage with the mobile terminal.

In another example, the controller may extract signal intensity information from signal information of the position signal transmitter, received from the mobile terminal, may search for the current position of the mobile terminal from a radio map including signal intensity values corresponding to a space cell inside a vehicle based on the extracted signal intensity, and when the retrieved current position of the mobile terminal corresponds to outside of the vehicle or the calculated distance or speed difference is equal to or greater than the threshold value, the controller may release wireless communication linkage with the mobile terminal.

According to embodiments of the present disclosure, a computer-readable recording medium having recorded thereon a program for executing a method of controlling wireless communication linkage of a wireless communication linkage control apparatus in a vehicle may perform procedures provided in the method of controlling wireless communication linkage of the wireless communication linkage control apparatus in the vehicle.

A wireless communication linkage control apparatus according to another embodiment of the present disclosure will be described below.

Another embodiment of the present disclosure may include a communicator that is wirelessly communication-linked with a mobile terminal, a position signal receiver for recognizing a position of a vehicle, and a controller for controlling the communicator.

Here, the controller may receive GPS information including position information from a mobile terminal, may compare a position signal of the vehicle with GPS information of a mobile terminal to calculate a distance or speed difference between the mobile terminal and the vehicle, and when the calculated distance or speed difference is equal to or greater than a threshold value, the controller may determine that the current position of the mobile terminal is outside of the vehicle and may release wireless communication linkage with the mobile terminal.

Another embodiment of the present disclosure may further include a position signal transmitter for transmitting a position signal to a mobile terminal.

Here, when determining the current position of the mobile terminal, the controller may determine whether the mobile terminal recognizes a high-frequency sound of a signal received from a position information transmitter based on signal information of the position signal transmitter, received from the mobile terminal, and when the mobile terminal does not recognize the high-frequency sound of the position signal transmitter or the calculated distance or speed difference is equal to or greater than a threshold value, the controller may determine that the current position of the mobile terminal is outside of the vehicle and may release wireless communication linkage with the mobile terminal.

Another embodiment of the present disclosure may further include three position signal transmitters or more for transmitting a position signal to the mobile terminal.

Here, the controller may perform trilateration to calculate the current position of the mobile terminal based on information transmitted by the mobile terminal in response to the first, second, and third position signal information of the position signal transmitters, and when the calculated current position of the mobile terminal corresponds to outside of the vehicle or the calculated distance or speed difference is equal to or greater than the threshold value, the controller may release wireless communication linkage with the mobile terminal.

Another embodiment of the present disclosure may further include a position signal transmitter for transmitting a position signal to the mobile terminal.

Here, the controller may extract signal intensity information of signal information of a position signal transmitter, received from the mobile terminal, may search for the current position of the mobile terminal from a radio map including signal intensity values corresponding to a space cell inside a vehicle based on the extracted signal intensity, and when the retrieved current position of the mobile terminal corresponds to outside of the vehicle or the calculated distance or speed difference is equal to or greater than a threshold value, the controller may release wireless communication linkage with the mobile terminal.

A wireless communication linkage control apparatus according to another embodiment of the present disclosure will be described below.

Another embodiment of the present disclosure may include a communicator that is wirelessly communication-linked with a mobile terminal, a position signal receiver for recognizing a position of a vehicle, a position signal transmitter for transmitting a position signal to the mobile terminal, and a controller for controlling the communicator.

Here, when the mobile terminal is in wireless communication linkage, the controller may acquire state information of the vehicle, may determine a position determination method of the mobile terminal based on the acquired state information of the vehicle, may determine a current position determination method of the mobile terminal as the determined position determination method, and may determine the current position of the mobile terminal using the determined position determination method, and when determining that the current position of the mobile terminal is outside of the vehicle, the controller may control the communicator to release wireless communication linkage with the mobile terminal.

For example, the position signal transmitter may include a Bluetooth low energy (BLE) beacon.

When acquiring state information of the vehicle, the controller may acquire information on opening and closing of a vehicular window, information on opening and closing of a vehicular door, and information on the current position of the vehicle.

Here, when the vehicular window or door is open, the controller may determine a method other than the position determination method using a high-frequency sound technology as the position determination method, and when GPS signal intensity of the vehicle is equal to or less than a threshold value, the controller may determine a method other than the position determination method using position information of the mobile terminal as the position determination method.

Then, when determining the position determination method of the mobile terminal, the controller may apply a weight of position determination methods of the mobile terminal based on the state information of the vehicle, and may determine the position determination method of the mobile terminal based on the applied weight.

Here, when applying a weight, the controller may apply a weight of a first position determination method using a high-frequency sound technology, a second position determination method using a trilateration technology, a third position determination method using a finger printing technology, and a fourth position determination method using position information of the mobile terminal, among the position determination methods of the mobile terminal.

When the controller applies the weight, a method of applying a weight of the position determination methods of the mobile terminal may be changed depending on the state information of the vehicle.

Here, when the controller applies the weight, if the controller determines that a vehicular window is closed and the current position of the vehicle is not a downtown area from the state information of the vehicle, the controller may apply the weight of the position determination methods of the mobile terminal to a first weight applying method, if the controller determines that the vehicular window is closed and the current position of the vehicle is a downtown area from the state information of the vehicle, the controller may apply the weight of the position determination methods of the mobile terminal to a second weight applying method, if the controller determines that the vehicular window is open and the current position of the vehicle is not a downtown area from the state information of the vehicle, the controller may apply the weight of the position determination methods of the mobile terminal to a third weight applying method, and if the controller determines that the vehicular window is open and the current position of the vehicle is a downtown area from the state information of the vehicle, the controller may apply the weight of the position determination methods of the mobile terminal to a fourth weight applying method.

For example, when the controller applies a weight to the first weight applying method, if the controller determines that the vehicular window is closed and the current position of the vehicle is not a downtown area from the state information of the vehicle, the controller may apply a first weight as the highest weight to the position determination method using a high-frequency sound technology, may apply a second weight lower than the first weight to the position determination method using position information of the mobile terminal, and may apply a third weight lower than the second weight to each of the position determination method using a trilateration technology and the position determination method using a finger printing technology, among the position determination methods of the mobile terminal.

In another example, when the controller applies a weight to a second weight applying method, if the controller determines that a vehicular window is closed and the current position of the vehicle is a downtown area from state information of the vehicle, the controller may apply a first weight as the highest weight to the position determination method using a high-frequency sound technology, may apply a second weight lower than the first weight to the position determination method using a finger printing technology, and may apply a third weight lower that the second weight to each of the position determination method using a trilateration technology and the position determination method using position information of the mobile terminal, among the position determination methods of the mobile terminal.

In another example, when the controller applies a weight to a third weight applying method, if the controller determines that a vehicular window is open and the current position of the vehicle is not a downtown area from state information of the vehicle, the controller may apply the same weight to each of the position determination method using a high-frequency sound technology, the position determination method using position information of the mobile terminal, the position determination method using a trilateration technology, and the position determination method using a finger printing technology, among the position determination methods of the mobile terminal.

In another example, when the controller applies a weight to a fourth weight applying method, if the controller determines that a vehicular window is open and the current position of the vehicle is a downtown area, the controller may apply a first weight as the highest weight to the position determination method using a finger printing technology, may apply a second weight lower than the first weight to each of the position determination method using a high-frequency sound technology and the position determination method using a trilateration technology, and may apply a third weight lower than the second weight to the position determination method using position information of the mobile terminal, among the position determination methods of the mobile terminal Then, when determining the position determination method of the mobile terminal, the controller may check a weight applied to each of the position determination methods of the mobile terminal, may select a position determination method to which the highest weight is applied, and may determine the selected position determination method as the position determination method of the mobile terminal.

For example, when the controller determines the current position of the mobile terminal, if the determined position determination method is the position determination method using a high-frequency sound technology, the controller may determine whether the mobile terminal recognizes a high-frequency sound of a signal received from the position signal transmitter based on signal information of the position signal transmitter, received from the mobile terminal, and in this regard, when determining that the mobile terminal recognizes the high-frequency sound of the position signal transmitter, the controller may determine that the current position of the mobile terminal is inside of the vehicle.

In another example, when the controller determines the current position of the mobile terminal, if the determined position determination method is the position determination method using a trilateration technology, the controller may perform trilateration based on signal information of first, second, and third position signal transmitters, received from the mobile terminal, to calculate the current position of the mobile terminal, and may determine that the current position of the mobile terminal is inside or outside of the vehicle based on the calculated current position of the mobile terminal.

In another example, when the controller determines the current position of the mobile terminal, if the determined position determination method is the position determination method using a finger printing technology, the controller may extract signal intensity from signal information of the position signal transmitter, received from the mobile terminal, may search for the current position of the mobile terminal from a radio map including signal intensity values corresponding to a space cell inside a vehicle based on the extracted signal intensity, and may determine that the current position of the mobile terminal is inside or outside of the vehicle based on the retrieved current position of the mobile terminal.

In another example, when the controller determines the current position of the mobile terminal, if the determined position determination method is the position determination method using position information of the mobile terminal, the controller may receive global positioning system (GPS) information including position information from the mobile terminal, may calculate a distance or speed difference between the vehicle and the mobile terminal based on GPS information of the mobile terminal and GPS information as the position signal of the vehicle, and may determine the current position of the mobile terminal based on the calculated distance or speed difference.

As such, according to embodiments of the present disclosure, the position determination method of the mobile terminal may be determined based on state information of the vehicle to determine the current position of the mobile terminal, and thus maintenance or release of wireless communication linkage with the mobile terminal may be reliably and optimally controlled depending on the position of the mobile terminal.

For example, when a user of a smartphone goes outside of the vehicle from the inside of the vehicle while holding the smartphone, Bluetooth (BT) between an audio video navigation telematics (AVNT) system and the smartphone may be normally released to enhance marketability.

According to embodiments of the present disclosure, linkage with a user's smartphone positioned outside the vehicle may be prevented, thereby enhancing the usability of BT.

According to the wireless communication linkage control apparatus in a vehicle and the wireless communication linkage control method thereof related to at least one embodiment of the present disclosure as configured above, the position determination method of the mobile terminal may be determined based on state information of the vehicle to determine the current position of the mobile terminal, and thus maintenance or release of wireless communication linkage with the mobile terminal may be reliably and optimally controlled depending on the position of the mobile terminal.

For example, when a user of a smartphone goes out of the vehicle from the inside of the vehicle while holding the smartphone, Bluetooth (BT) between an audio video navigation telematics (AVNT) system and the smartphone may be normally released to enhance marketability.

According to embodiments of the present disclosure, linkage with a user's smartphone positioned outside the vehicle may be prevented, thereby enhancing the usability of BT.

It will be appreciated by persons skilled in the art that the effects that could be achieved with the present disclosure are not limited to what has been particularly described hereinabove and other advantages of the present disclosure will be more clearly understood from the detailed description.

The invention can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A wireless communication linkage control apparatus comprising:
   a communicator configured to be wirelessly communication-linked with a mobile terminal;
   a position signal transmitter configured to transmit a position signal to the mobile terminal; and
   a controller configured to:
      control the communicator,
      when the mobile terminal is in wireless communication linkage, acquire state information of a vehicle,
      determine a position determination technique of the mobile terminal based on the acquired state information of the vehicle,
      determine a current position of the mobile terminal using the determined position determination technique, and
      control the communicator to release the wireless communication linkage with the mobile terminal when the determined current position of the mobile terminal is outside of the vehicle,
   wherein:
      when a window or a door of the vehicle is open, the controller is configured to determine a technique other than a position determination technique using a high-frequency sound technology as the position determination technique of the mobile terminal; and
      when global positioning system (GPS) signal intensity of the vehicle is equal to or less than a threshold value, the controller is configured to determine a technique other than a position determination technique using position information of the mobile terminal as the position determination technique of the mobile terminal.

2. The wireless communication linkage control apparatus of claim 1, wherein the state information of the vehicle includes information on opening or closing of a window of the vehicle, information on opening or closing of a door of the vehicle, or information on the current position of the vehicle.

3. The wireless communication linkage control apparatus of claim 1, wherein the controller is configured to:
   apply a weight of position determination techniques of the mobile terminal based on the acquired state information of the vehicle; and
   determine the position determination technique of the mobile terminal based on the applied weight.

4. The wireless communication linkage control apparatus of claim 3, wherein the controller is configured to apply a weight of a first position determination technique using a high-frequency sound technology, a weight of a second position determination technique using a trilateration technology, a weight of a third position determination technique using a finger printing technology, and a weight of a fourth position determination technique using position information of the mobile terminal, among the position determination techniques of the mobile terminal.

5. The wireless communication linkage control apparatus of claim 3, wherein the controller is configured to change a technique of applying the weight of the position determination techniques of the mobile terminal depending on the acquired state information of the vehicle.

6. The wireless communication linkage control apparatus of claim 5, wherein the controller is configured to:
   determine whether a window of the vehicle is open or closed;

apply the weight of the position determination techniques of the mobile terminal according to first or second weight applying techniques when the controller determines that the window of the vehicle is closed; and
apply the weight of the position determination techniques of the mobile terminal according to third or fourth weight applying techniques when the controller determines that the window of the vehicle is open.

7. The wireless communication linkage control apparatus of claim 3, wherein the controller is configured to:
check a weight applied to each of the position determination techniques of the mobile terminal;
select a position determination technique to which the highest weight is applied; and
determine the selected position determination technique as the position determination technique of the mobile terminal.

8. The wireless communication linkage control apparatus of claim 1, wherein the determined position determination technique is a position determination technique using a high-frequency sound technology, and wherein the controller is configured to:
determine whether the mobile terminal recognizes a high-frequency sound of a signal received from the position signal transmitter based on signal information of the position signal transmitter, received from the mobile terminal; and
determine that the current position of the mobile terminal is inside of the vehicle when the controller determines that the mobile terminal recognizes the high-frequency sound of the position signal transmitter.

9. The wireless communication linkage control apparatus of claim 1, wherein the determined position determination technique is a position determination technique using a trilateration technology, and wherein the controller is configured to:
perform trilateration based on signal information of first, second, and third position signal transmitters, received from the mobile terminal, to calculate the current position of the mobile terminal; and
determine that the current position of the mobile terminal is inside of the vehicle or outside of the vehicle based on the calculated current position of the mobile terminal.

10. The wireless communication linkage control apparatus of claim 1, wherein the determined position determination technique is a position determination technique using a finger printing technology, and the controller is configured to:
extract signal intensity from signal information of the position signal transmitter, received from the mobile terminal;
search for the current position of the mobile terminal from a radio map including signal intensity values corresponding to a space cell inside the vehicle based on the extracted signal intensity; and
determine that the current position of the mobile terminal is inside of the vehicle or outside of the vehicle based on the searched current position of the mobile terminal.

11. The wireless communication linkage control apparatus of claim 1, wherein the determined position determination technique is a position determination technique using position information of the mobile terminal, and wherein the controller is configured to:
receive global positioning system (GPS) information including position information from the mobile terminal;
calculate a distance or a speed difference between the vehicle and the mobile terminal based on the GPS information of the mobile terminal and a position signal of the vehicle; and
determine the current position of the mobile terminal based on the calculated distance or speed difference.

12. A method of controlling wireless communication linkage of a wireless communication linkage control apparatus comprising a controller configured to control wireless communication linkage with a mobile terminal, a position signal receiver configured to recognize a position of a vehicle, and a position signal transmitter configured to transmit a position signal to the mobile terminal, the method comprising:
checking whether the mobile terminal is in the wireless communication linkage;
when the mobile terminal is in the wireless communication linkage, acquiring state information of the vehicle;
determining a position determination method of the mobile terminal based on the acquired state information of the vehicle;
determining a current position of the mobile terminal using the determined position determination method; and
when the determined current position of the mobile terminal is outside of the vehicle, releasing the wireless communication linkage with the mobile terminal,
wherein determining the position determination method of the mobile terminal includes:
applying a weight of position determination methods of the mobile terminal based on the acquired state information of the vehicle; and
determining the position determination method of the mobile terminal based on the applied weight.

13. The method of claim 12, wherein acquiring the state information of the vehicle includes acquiring information on opening and closing of a window of the vehicle, information on opening and closing of a door of the vehicle, or information on the current position of the vehicle.

14. The method of claim 12, wherein, in applying the weight, a method of applying the weight of the position determination methods of the mobile terminal is changed depending on the acquired state information of the vehicle.

15. The method of claim 12, wherein determining the current position of the mobile terminal includes:
when the determined position determination method is a position determination method using a high-frequency sound technology, determining whether the mobile terminal recognizes a high-frequency sound of a signal received from the position signal transmitter based on signal information of the position signal transmitter received from the mobile terminal; and
when determining that the mobile terminal recognizes the high-frequency sound of the position signal transmitter, determining that the current position of the mobile terminal is inside of the vehicle.

16. The method of claim 12, wherein determining the current position of the mobile terminal includes:
when the determined position determination method is a position determination method using a trilateration technology, performing trilateration based on signal information of first, second, and third position signal transmitters, received from the mobile terminal, to calculate the current position of the mobile terminal; and determining that the current position of the mobile terminal is inside or outside of the vehicle based on the calculated current position of the mobile terminal.

17. The method of claim 12, wherein determining the current position of the mobile terminal includes:

when the determined position determination method is a position determination method using a finger printing technology, extracting signal intensity from signal information of the position signal transmitter received from the mobile terminal;

searching for the current position of the mobile terminal from a radio map including signal intensity values corresponding to a space cell inside the vehicle based on the extracted signal intensity; and determining that the current position of the mobile terminal is inside or outside of the vehicle based on the searched current position of the mobile terminal.

18. The method of claim 12, wherein determining the current position of the mobile terminal includes:

when the determined position determination method is a position determination method using position information of the mobile terminal, receiving global positioning system (GPS) information including position information and speed information from the mobile terminal;

calculating a distance between the vehicle and the mobile terminal based on the GPS information of the mobile terminal; and determining that the current position of the mobile terminal is inside or outside of the vehicle based on the calculated distance.

* * * * *